(12) United States Patent
Natarajan et al.

(10) Patent No.: US 7,324,548 B2
(45) Date of Patent: Jan. 29, 2008

(54) TRANSCEIVER SYSTEM AND METHOD SUPPORTING VARIABLE RATES AND MULTIPLE PROTOCOLS

(75) Inventors: Vikram Natarajan, Balboa Island, CA (US); Kang Xiao, Irvine, CA (US); Mario Caresosa, Rancho Santa Margarita, CA (US); Jay Proano, Rancho Santa Margarita, CA (US); David Chung, Newport Beach, CA (US); Afshin Momtaz, Irvine, CA (US); Randy Stolaruk, Huntington Beach, CA (US); Xin Wang, Irvine, CA (US); Namik Kocaman, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 981 days.

(21) Appl. No.: 10/355,472

(22) Filed: Jan. 31, 2003

(65) Prior Publication Data

US 2004/0086003 A1    May 6, 2004

Related U.S. Application Data (60) Provisional application No. 60/423,070, filed on Nov. 1, 2002, provisional application No. 60/423,166, filed on Nov. 1, 2002, provisional application No. 60/423,294, filed on Nov. 1, 2002, provisional application No. 60/423,071, filed on Nov. 1, 2002, provisional application No. 60/423,034, filed on Nov. 1, 2002, provisional application No. 60/423,072, filed on Nov. 1, 2002, provisional application No. 60/423,074, filed on Nov. 1, 2002.

(51) Int. Cl.
| | |
|---|---|
| H04J 3/16 | (2006.01) |
| H04J 3/22 | (2006.01) |
| H04J 14/00 | (2006.01) |
| H04B 10/00 | (2006.01) |

(52) U.S. Cl. .................. 370/465; 370/545; 370/907; 398/43; 398/140

(58) Field of Classification Search ............ 370/465, 370/535, 537, 536, 907
See application file for complete search history.

(56) References Cited

U.S. PATENT DOCUMENTS

| | | | | |
|---|---|---|---|---|
| 6,430,201 | B1 * | 8/2002 | Azizoglu et al. ........... | 370/535 |
| 6,816,509 | B2 * | 11/2004 | Pelley et al. ............... | 370/466 |
| 7,072,348 | B2 * | 7/2006 | Frank ......................... | 370/412 |
| 7,106,968 | B2 * | 9/2006 | Lahav et al. ................ | 398/47 |
| 2001/0014104 | A1 | 8/2001 | Bottorff et al. | |
| 2002/0110157 | A1 * | 8/2002 | Jorgenson et al. .......... | 370/537 |
| 2002/0159473 | A1 | 10/2002 | Roberts | |

* cited by examiner

*Primary Examiner*—Chau Nguyen
*Assistant Examiner*—Nittaya Juntima
(74) *Attorney, Agent, or Firm*—McAndrews Held & Malloy Ltd.

(57) ABSTRACT

Present herein is a multirate transceiver wherein data can be received at a first data rate and transmitted at a second data rate. The transceiver device comprises a first interface for receiving data at one data rate a mapper that can map data from a first rate to the second rate, and a second interface for transmitting the data at the second data rate.

6 Claims, 11 Drawing Sheets

TRANSCEIVER SYSTEM AND METHOD SUPPORTING VARIABLE RATES AND MULTIPLE PROTOCOLS

RELATED APPLICATIONS

This application claims priority to U.S. Provisional Application Ser. No. 60/423,070, filed Nov. 1, 2002, which is incorporated by reference, herein. Each of the following applications are related to the present application and incorporated herein by reference:

| Ser. No. | Title | Docket No. | Filed | Inventor(s): |
|---|---|---|---|---|
| 60/423,166 | Two Wire Bus for a Transceiver System | 14104US01 | Nov. 1, 2002 | Chenmin Zhang, Steve Thomas, Randall Stolaruk |
| 60/423,294 | System and Method Supporting Auto-Recovery in a Transceiver System | 14105US01 | Nov. 1, 2002 | Kang Xiao, Mario Caresosa, Hongtao Jiang, Randall Stolaruk |
| 60/423,071 | Method Supporting Transceiver and Framer Synchronization | 14106US01 | Nov. 1, 2002 | Jay Proano, Sheila Qiu, Tim Chan, Hongtao Jiang |
| 60/423,034 | Multi-Rate On-Chip OCN Filter for a Transceiver System | 14107US01 | Nov. 1, 2002 | Ichiro Fujimori, Mario Caresosa, and Namik Kocaman |
| 60/423,072 | Transceiver System and Method Supporting Multiple Selectable VCOs | 14108US01 | Nov. 1, 2002 | Mario Caresosa, Namik Kocaman |
| 60/423,074 | Configurable VCO System and Method | 14109US01 | Nov. 1, 2002 | Mario Caresosa, Namik Kocaman, Afshin Momtaz |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to Optical Internetworking, and more particularly to a multi-rate transceiver with Rate Adaptation.

Synchronous Optical Networking (SONET) is a standard way to multiplex high-speed traffic from multiple vendors' multiplexers onto fiber optic cabling. SONET equipment and software enable network providers to carry traffic from many types of customer equipment in a uniform way on backbone fiber optic cabling.

SONET is slightly different in the long haul space compared to the metro space. SONET for the metro space provides additional functionality for other protocols, such as Gigabit Ethernet, ESCON, FIBERCON, Fiber Channel 2X, and HDTV, to name a few.

Service providers provide services to various customers by provisioning a line card for the customer. Line cards handle one of a several standard rates. TABLE 1 identifies a list of different rates. In order to provide customers with different data rates, service providers install different line cards, wherein each line card handles a different data rate. In cases where a service provider has many customers, it is likely that the service provider has many line cards to accommodate the different user requirements. However, in cases where a service provider has fewer customers, it is likely that the service provider will need to purchase a new line card to accommodate a new customer with different rate requirements.

Accordingly it would be advantageous to provide a more flexible scheme for accommodation of the varying user requirements. Further limitations and disadvantages of connection and traditional approaches will become apparent to one of skill in the art, through comparison of such systems with embodiments of the present invention as set forth in the remainder of the present application.

BRIEF SUMMARY OF THE INVENTION

A highly integrated variable rate transceiver/mapper operating at a plurality of data rates is presented herein. The transceiver device has an integrated serial clock and data recovery (CDR) circuit, loss-of-signal (LOS) detection circuitry, performance monitoring, and a number of other advanced features.

These and other advantages and novel features of the present invention, as well as details of an illustrated embodiment thereof, will be more fully understood from the following description and drawings.

DETAILED DESCRIPTION OF THE INVENTION

Figure 1:
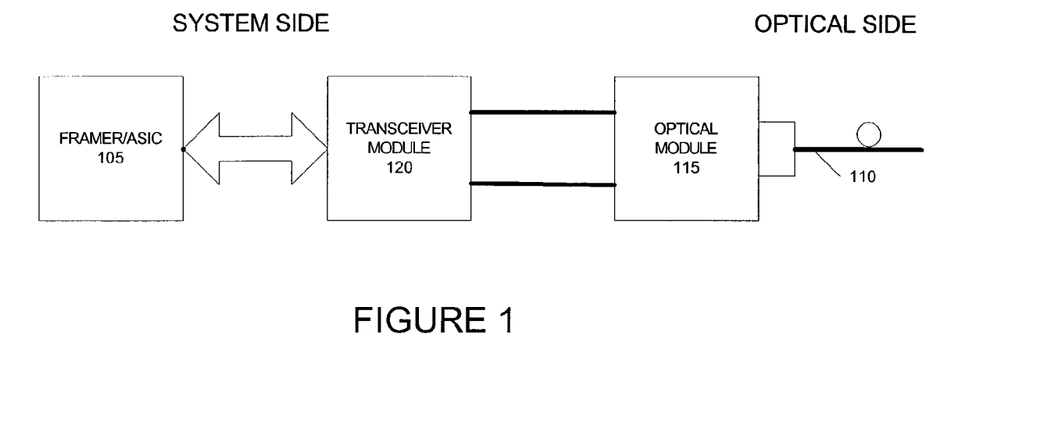
FIG. 1 is a block diagram of an exemplary data transmission environment wherein the present invention can be practiced.

Referring now to FIG. 1, there is illustrated a block diagram of an exemplary data transmission environment wherein the present invention can be practiced. In the data transmission environment, data is bidirectionally transmitted between an Application Specific Integrated Circuit (ASIC) or framer 105 and an optical network 110.

The optical network 110 is connected to an optical module 115. The optical network 115 comprises the electrical to optical interface wherein electronic signals from the ASIC/framer 105 are converted to optical signals for transmission over the optical fiber 110. The optical module 115 also comprises the optical to electrical interface where optical signals from the optical fiber 110 are converted to electrical signals for the ASIC/framer 105.

The optical network 110 comprises various infrastructure. The optical module 115 and optical network 110 form what is generally referred to as the optical side of the data transmission environment. The region comprising the ASIC/framer 105 is referred to as the system side.

The optical side may be configured to transmit and receive data in accordance with any one of a number of different protocols or formats. Exemplary protocols or formats include, Synchronous Optical Networking (SONET), OC-3, 12, 48, Fiber Connectivity (FIBERCON), and Gigabit Ethernet. The system side may also be configured to transmit and receive data in accordance with any of the foregoing protocols or formats.

The present invention proposes a transceiver 120 for adapting the protocol or format of the system side to the protocol or format of the optical side, and vice versa. The transceiver 120 receives data from both the optical side and the system side. The data received from the system side is processed to adapt to the format of the optical side. The data received from the optical side is adapted to the format of the system side. The processing can include serializing, deserializing, mapping, demapping, scrambling, descrambling, and error correction, or any combination thereof.

Figure 2:
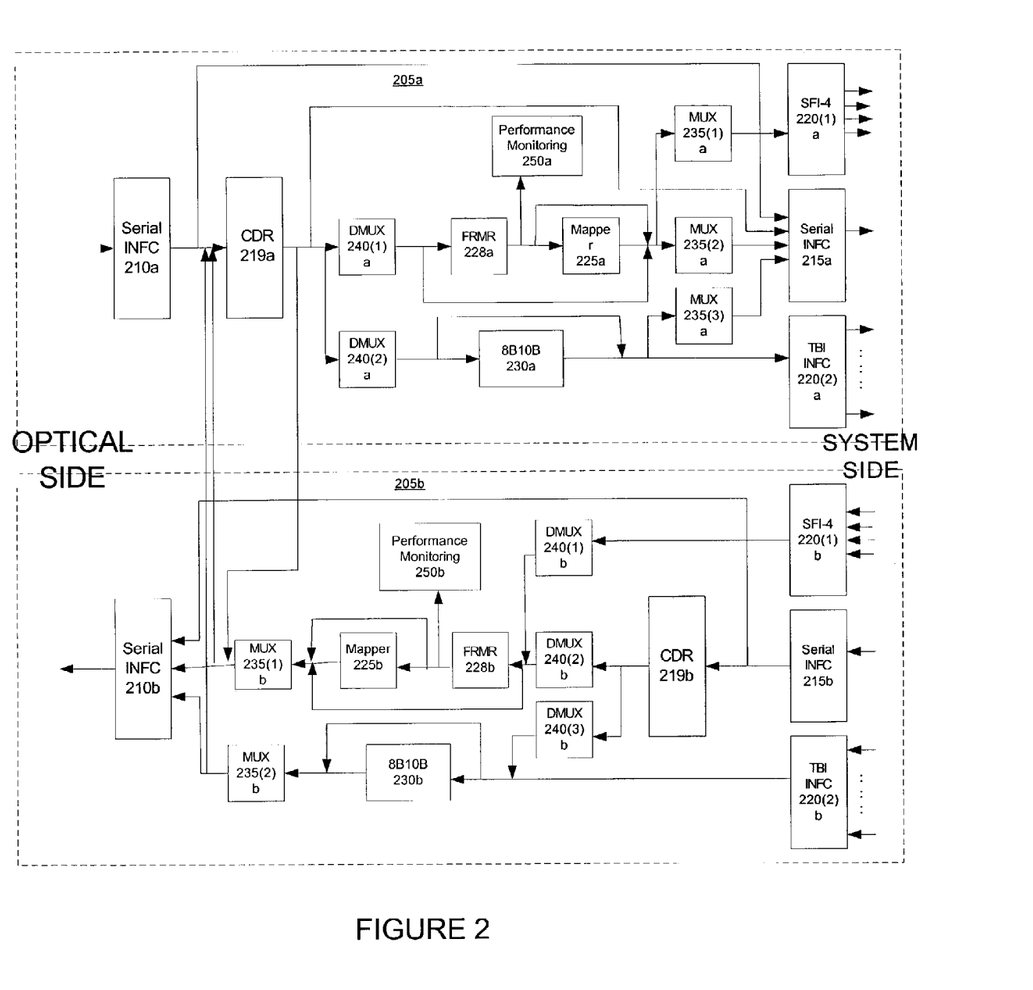
FIG. 2 is a block diagram of an exemplary transceiver in accordance with the present invention.

Referring now to FIG. 2, there is illustrated a block diagram of a transceiver 120 in accordance with an embodiment of the present invention. The transceiver 120 can adapt data received from the optical side to the format on the system side and vice versa. Although the embodiment is described with a particular emphasis on Gigabit Ethernet, SONET, and OC-3, 12, and 48, it should be noted that the transceiver 120 is not limited to the foregoing.

The transceiver 120 includes an ingress path 205a and an egress path 205b. The ingress path 205a receives data from the optical side and transmits the data towards the system side, while the egress path 205b receives data from the system side and transmits the data towards the optical side.

Data is transmitted serially on the optical side while the data may be transmitted in either serial or parallel on the system side. Accordingly, the transceiver 120 comprises serial interfaces 210 for transmitting/receiving data to/from the optical side. The transceiver 120 includes both serial interfaces 215, and parallel interfaces 220(1), 220(2) for transmitting/receiving data to/from the system side.

In the present embodiment, the parallel interface 220(1) comprises an interface in accordance with the SFI-4 specification, the parallel interface 220(2) comprises a 10-bit interface (TBI). In an exemplary case, the SFI-4 220(1) interface can be used to transmit/receive data in accordance with the 4-bit SONET standard. In another exemplary case, the parallel interface 220(2) can be used to transmit/receive data in accordance with the Gigabit Ethernet standard. In another case, the serial interface 215 can be used to transmit/receive data in accordance with either the OC-3, 12 or 48 standard. The serial interface 210 towards the optical side can be configured to transmit data in accordance with either the OC-3, 12, or 48 standard The ingress path 205a comprises a clock and data recovery unit (CDR) 219a, framer 228a, mapper 225a, encoder/decoder module 230a, multiplexers 235(1)a, 235(2)a, 235(3)a, and demultiplexers 240(1)a, 240(2)a. The egress path 205b comprises clock and data recovery unit (CDR) 219b, framer 228b, mapper 225b, encoder/decoder module 230b, multiplexers 235(1)b, 235(2)b, 235(3)b, and demultiplexers 240(1)b, 240(2)b. The foregoing are interconnected in both the ingress path 205a and the egress path 205b in a manner, wherein a plurality of selectable paths exist between the optical side and the system side. Switches (not shown) are placed at junctions where multiple segments intersect to allow selection of a particular one of the intersecting segments. A particular path can be selectively realized by appropriate selection by the switches. As will be shown below, utilization of a particular one of the plurality of paths can adapt data received from the optical side for transmission to the system side, and vice versa.

Also included is a bypass path in both the ingress path 205a and the egress path 205b which allows transmission of data directly between the serial interfaces. Additionally, feedback paths can also be provided connecting the egress path to the ingress path, and vice versa. The foregoing feedback paths can be used for testing the transceiver. For example, data can be received by the egress path 205b from the system side and looped back across a feedback path to the ingress path 205a and transmitted to the system side. In certain embodiments, data can be transmitted from SFI-4 interface 220(1)b to SFI-4 interface 220(1)a, TBI interface 220(2)b to TBI interface 220(2)a, or serial interface 215b to serial interface 215a.

Also included are performance monitoring modules 250a, 250b. The performance monitoring modules 250a, 250b detect errors by performing parity checks. The performance monitoring modules 250a, 250b can transmit a report to a user interface within the transceiver module 120, wherein an excessive number of errors are detected.

The operation of the transceiver 120 will now be described in the following exemplary illustrations. It is noted that the foregoing illustrations are by way of example and are not intended to be exhaustive.

Figure 3:
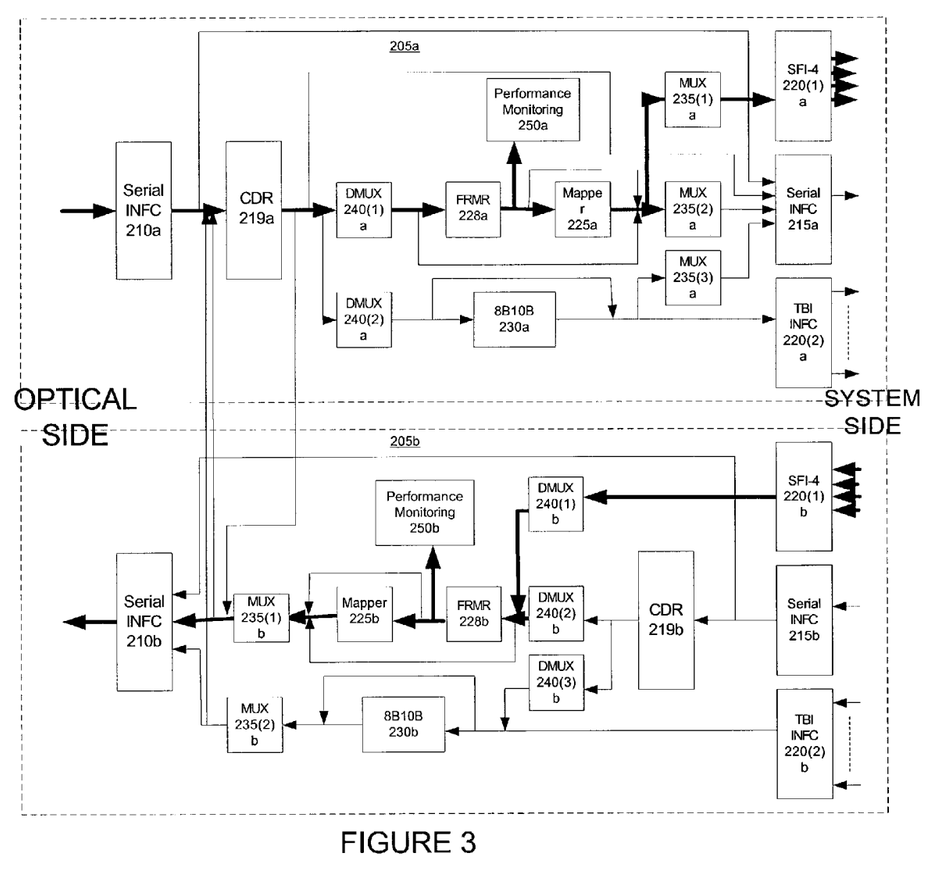
FIG. 3 is a block diagram of the transceiver of FIG. 2 configured for serial SONET on the optical side, and parallel SONET on the system side.

Referring now to FIG. 3, there is illustrated a block diagram of the transceiver of FIG. 2 configured for serial SONET on the optical side, and parallel SONET on the system side.

Data is received from the system side at the SFI-4 interface 220(1)b in the egress path 205b. The SFI-4 interface 220(1)b provides the data to a demultiplexer 240(1)b. The demultiplexer 240(1)b is a 1:4 DEMUX which deserializes the input signal, thereby resulting in 16 bit words. The 16-bit words are provided to a framer 228*b*. The framer 228*b* generates frames which are provided to the mapper 225*b*. The mapper 225*b* maps the frames to 16 bit words at 155.5 MHz, thereby resulting in an aggregated 2.488 Gbps, or OC-48 signal. The signal from the mapper 225*b* is provided to a 16:1 multiplexer 235(1)*b*.

As can be seen from the illustration, a bypass route is included for bypassing the mapper 225*b* when mapping is not desired. In an alternate embodiment, the framer 228*b* and mapper 225*b* can be bypassed, and the data transmitted from the demultiplexer 240(1)*b* directly to the multiplexer 235(1)*b*.

The multiplexer 235(1)*b* serializes the 16-bit words. The multiplexer 235(1)*b* provides the serialized signal to the serial interface 210*b* which outputs the 2.488 Gbps signal to the optical side.

The transceiver module 120 receives data from the optical side at the ingress path at serial interface 210*a*. The serial interface 210*a* provides the received data to a CDR 219*a*. The CDR 219*a* recovers the data and provides a clock signal to demultiplexer 240(1)*a*. The demultiplexer 240(1)*a* is a 1:16 demultiplexer which converts the received data to 16-bit words. The demultiplexer 240(1)*a* outputs the 16-bit words to framer 228*a*.

The framer 228*a* creates frames and transmits the frames to the mapper 225*a*. The mapper 225*a* maps the data to a format utilized by the system side. The format can comprise for example OC-3, 12, or 48. The mapper 225*a* outputs the mapped signal to a 16:4 multiplexer 235(1)*a*.

As can be seen from the illustration, a bypass route is included for bypassing the mapper 225*a* when mapping is not desired. In an alternate embodiment, both the framer 228*a* and mapper 225*a* can be bypassed, and the data transmitted from the demultiplexer 240(1)*a* directly to the multiplexer 235(1)*a*.

The 16:4 multiplexer 235(1)*a* outputs four bit words to the SFI-4 interface 220(1)*a* which provides the four bit words in accordance with 4-bit SONET to the system side.

The CDR 219*a* is described in greater detail in "Configurable VCO System and Method", Provisional Patent Application, Ser. No. 60/423,074, filed Nov. 1, 2002, by Mario Caresosa, Namik Kocaman, and Afshin Momtaz.

Figure 4:
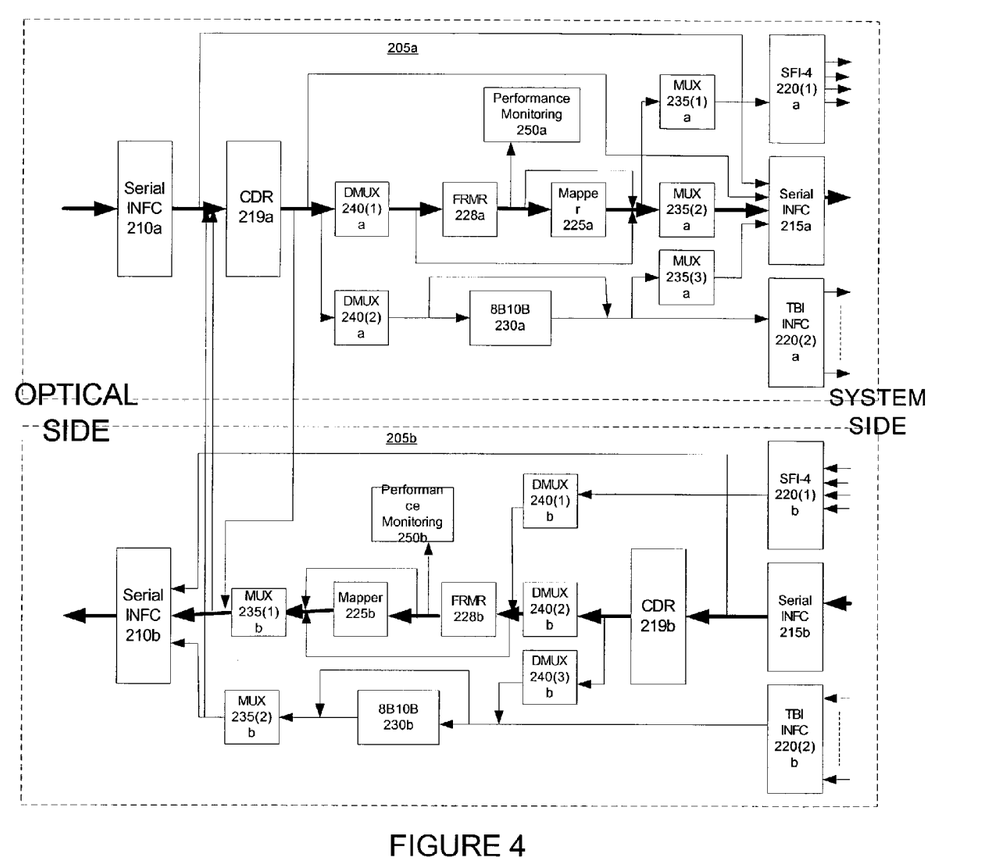
FIG. 4 is a block diagram of the transceiver of FIG. 2 configured for serial SONET on the optical side and serial SONET on the system side.

Referring now to FIG. 4, there is illustrated a block diagram of the transceiver of FIG. 2 configured for serial SONET on the optical side and serial SONET on the system side.

Data is received from the system side at the serial interface 215*b* in the egress path 205*b*. The serial interface 215*b* provides the data to a CDR 219*b*. The CDR 219*b* recovers the data and provides a clock signal to demultiplexer 240(2)*b*. The demultiplexer 240(2)*b* is a 1:16 DEMUX which deserializes the input signal, thereby resulting in 16 bit words. The 16-bit words are provided to a framer 228*b*. The framer 228*b* generates frames which are provided to the mapper 225*b*. The mapper 225*b* maps the frames to 16 bit words at 155.5 MHz, thereby resulting in an aggregated 2.488 Gbps, or OC-48 signal. The signal from the mapper 225*b* is provided to a 16:1 multiplexer 235(1)*b*.

As can be seen from the illustration, a bypass route is included for bypassing the mapper 225*b* when mapping is not desired. In an alternate embodiment, both the framer 228*b* and mapper 225*b* can be bypassed, and the data transmitted from the demultiplexer 240(2)*b* directly to the multiplexer 235(1)*b*.

The multiplexer 235(1)*b* serializes the 16-bit words. The multiplexer 235(1)*b* provides the serialized signal to the serial interface 210*b* which outputs the 2.488 Gbps signal to the optical side.

The transceiver module 120 receives data from the optical side at the ingress path at serial interface 210*a*. The serial interface 210*a* provides the received data to a CDR 219*a*. The CDR 219*a* recovers the data and provides a clock signal to demultiplexer 240(1)*a*. The demultiplexer 240(1)*a* is a 1:16 demultiplexer which converts the received data to 16-bit words. The demultiplexer 240(1)*a* outputs the 16-bit words to framer 228*a*. The framer 228*a* creates frames and transmits the frames to the mapper 225*a*. The mapper 225*a* maps the data to a format utilized by the system side. The format can comprise for example OC-3, 12, or 48. The mapper 225*a* outputs the mapped signal to a 16:1 multiplexer 235(2)*a*.

As can be seen from the illustration, a bypass route is included for bypassing the mapper 225*a* when mapping is not desired. In an alternate embodiment, both the framer 228*a* and mapper 225*a* can be bypassed, and the data transmitted from the demultiplexer 240(1)*a* directly to the multiplexer 235(2)*a*.

The 16:1 multiplexer 235(2)*a* outputs serialized data to the serial interface 215*a* which outputs the serialized data in accordance with serialized SONET to the system side.

Figure 5:
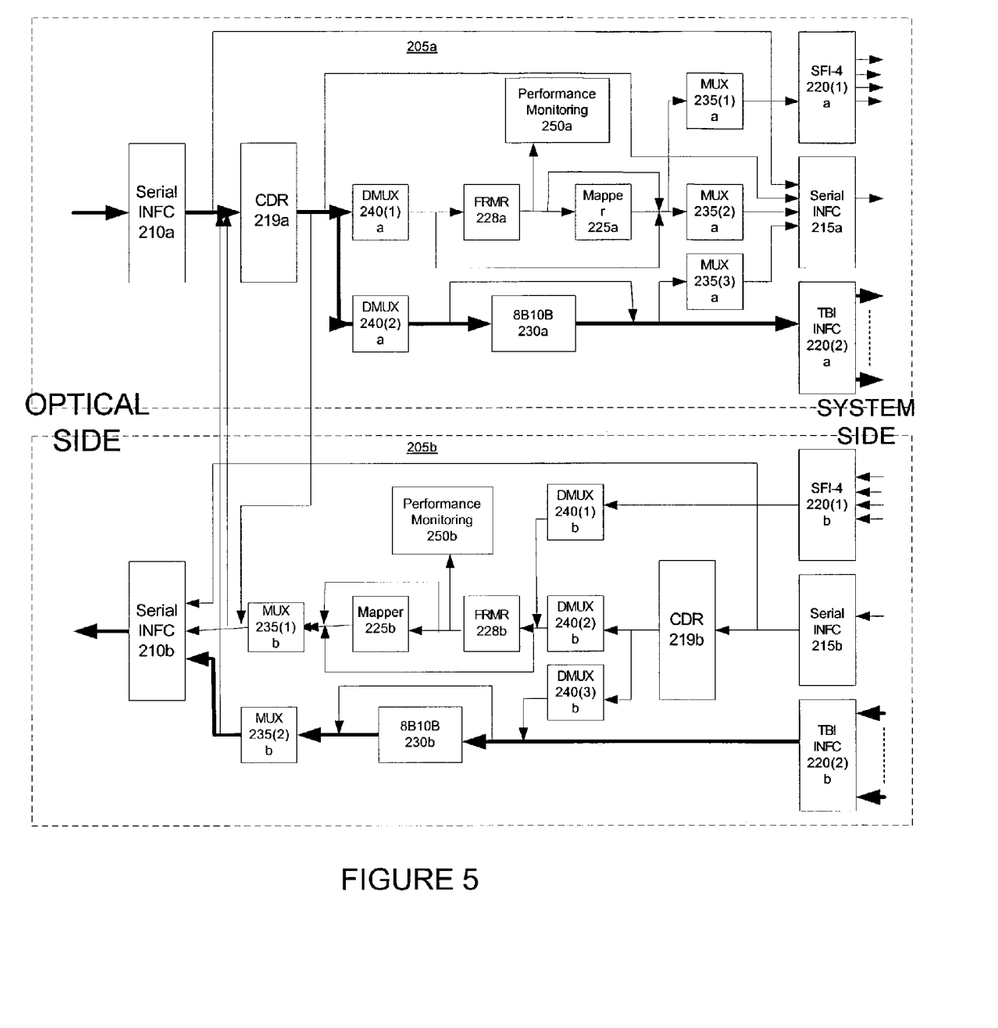
FIG. 5 is a block diagram of the transceiver of FIG. 2 configured for serial SONET on the optical side and parallel Gigabit Ethernet on the system side.

Referring now to FIG. 5 there is illustrated a block diagram of the transceiver of FIG. 2 configured for serial Gigabit Ethernet on the optical side and parallel Gigabit Ethernet on the system side.

Data is received from the system side at TBI interface 220(2)*b*. The TBI interface provides the data to 8*b*10*b* encoder/decoder unit 230*b*. The encoded signal from the 8*b*10*b* 230*b* is then transmitted to multiplexer 235(2)*b*. The multiplexer 235(2)*b* is a 10:1 MUX which serializes the encoded signal and provides the serialized encoded signal to the serial interface 210*b*. The serial interface 210*b* outputs the serialized encoded Gigabit Ethernet signal to the optical side.

The transceiver module 120 receives data from the optical side at the ingress path at serial interface 210*a*. The serial interface 210*a* provides the received data to a CDR 219*a*. The CDR 219*a* recovers the data and provides a clock signal to demultiplexer 240(2)*a*. The demultiplexer 240(2)*a* is a 1:10 demultiplexer which converts the received data to 10-bit words. The 10-bit words are provided to the 8*b*10*b* encoder/decoder unit 230*a*. The decoded signal is transmitted by the 8*b*10*b* 230*a* to the TBI Interface 220(2)*a*. The TBI interface 220(2)*a* outputs a signal in accordance with the parallel Gigabit Ethernet standard.

Figure 6:
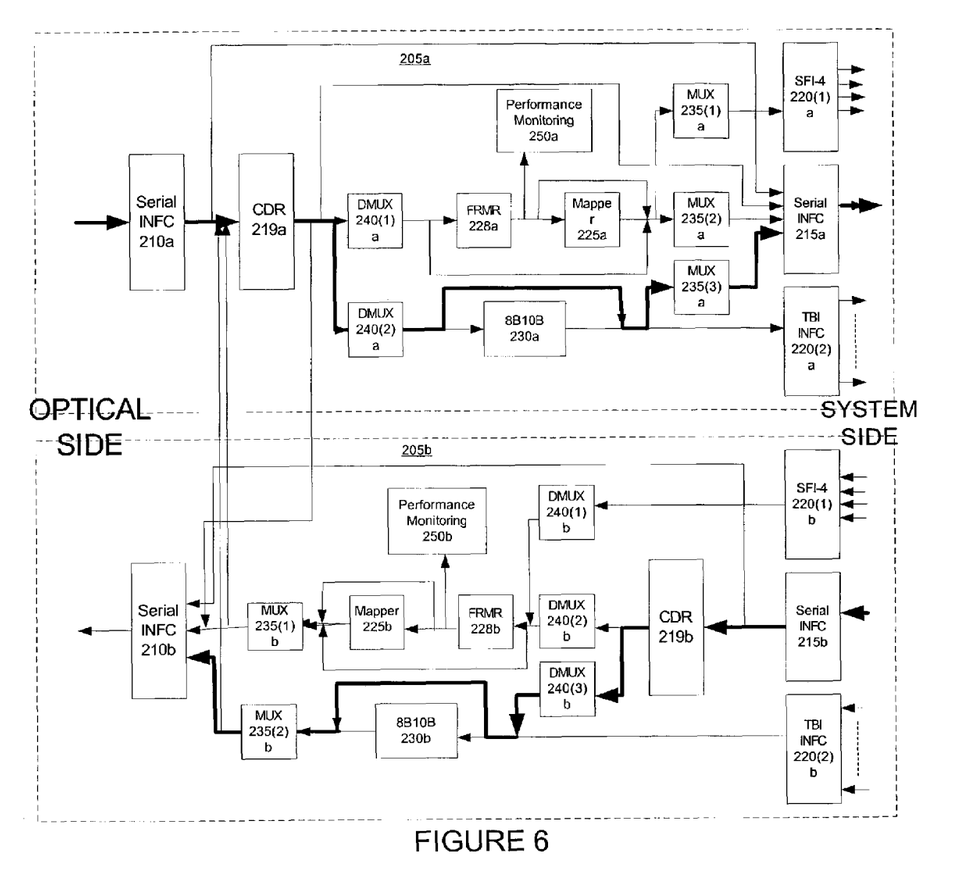
FIG. 6 is a block diagram of the transceiver of FIG. 2 configured for serial SONET on the optical side and serial Gigabit Ethernet on the system side.

Referring now to FIG. 6 there is illustrated a block diagram of the transceiver of FIG. 2 configured for serial Gigabit Ethernet on the optical side and serial Gigabit Ethernet on the system side.

Data is received from the system side at serial interface 215*b*. The serial interface 215*b* provides the data to CDR 219*b*. The CDR 219*b* recovers the data and a clock signal and provides the data and clock signal to demultiplexer 240(3)*b*. The demultiplexer 240(3)*b* deserializes the data signal resulting in 10 bit words. The 10-bit words bypass the 8*b*10*b* encoder/decoder unit 230*b* and are transmitted to multiplexer 235(2)*b*. The multiplexer 235(2)*b* is a 10:1 MUX which serializes the encoded signal and provides the serialized encoded signal to the serial interface 210*b*. The serial interface 210*b* outputs the serialized encoded Gigabit Ethernet signal to the optical side.

The transceiver module 120 receives data from the optical side at the ingress path at serial interface 210a. The serial interface 210a provides the received data to a CDR 219a. The CDR 219a recovers the data and provides a clock signal to demultiplexer 240(2)a. The demultiplexer 240(2)a is a 1:10 demultiplexer which converts the received data to 10-bit words. The 10-bit words bypass the 8b10b encoder/decoder unit 230a and are transmitted to multiplexer 235(3)a. The multiplexer 235(3)a serializes the signal and provides the serialized signal to the serial interface 215a. The serial interface 215a outputs the data signal in accordance with the serial Gigabit Ethernet standard.

Figure 7:
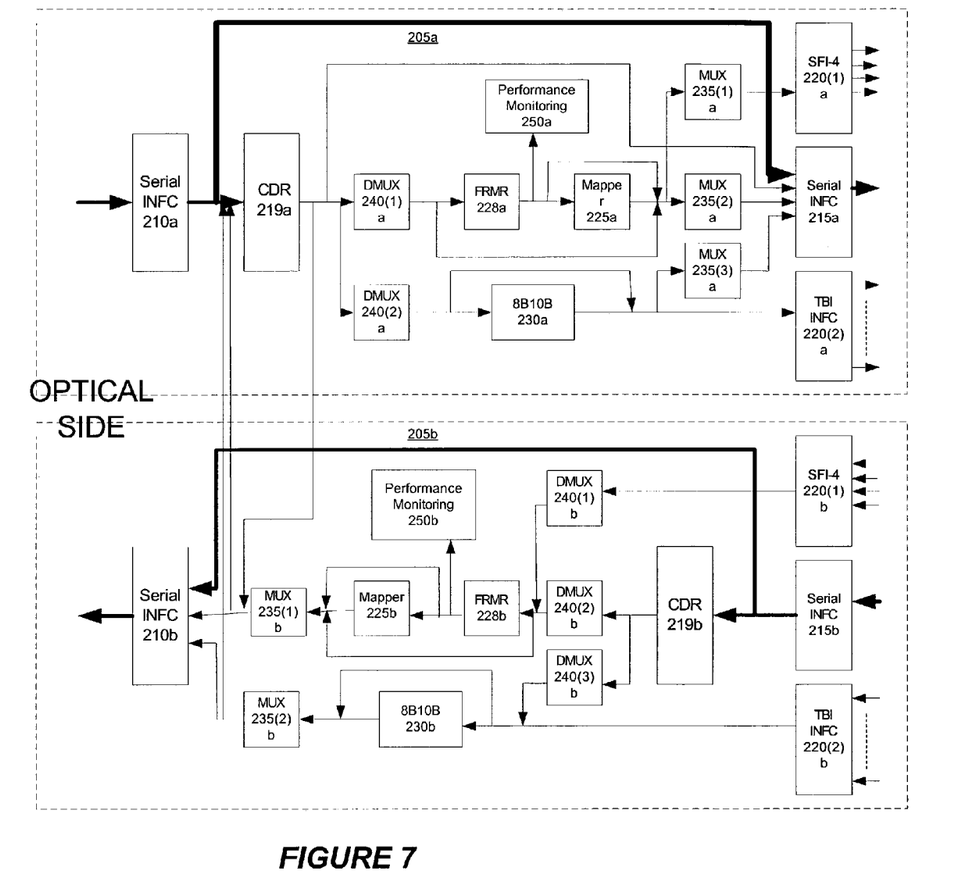
FIG. 7 is a block diagram of the transceiver of FIG. 2 configured to operate in a bypass mode.

Referring now to FIG. 7, there is illustrated a block diagram of the transceiver of FIG. 2, configured to operate in a bypass mode. In the bypass mode, data is received from the system side at the serial interface 215b and transmitted directly to the optical side via serial interface 210b. Data received from the optical side is received at serial interface 210a and transmitted directly to serial interface 215a. The bypass mode can be used with any rate.

Figure 8:
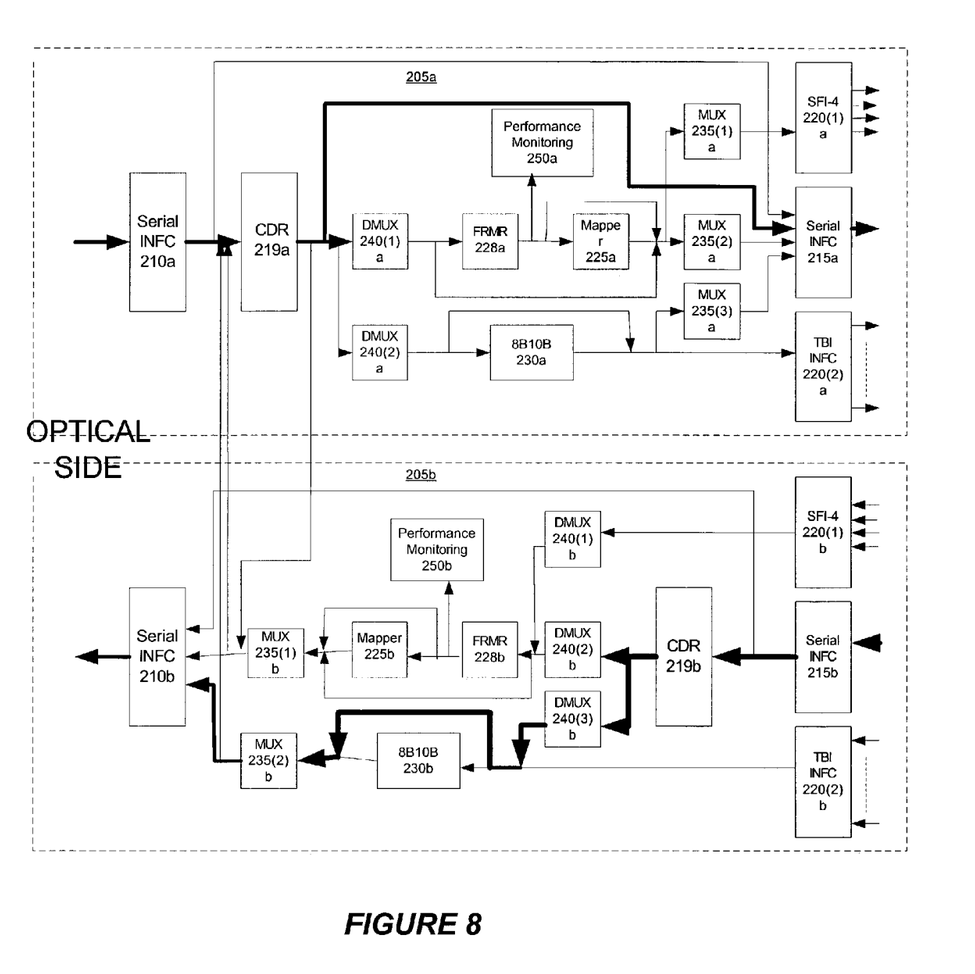
FIG. 8 is a block diagram of the transceiver of FIG. 2 configured to operate in a Gigabit Ethernet retimed mode.

Referring now to FIG. 8, there is illustrated a block diagram of the transceiver of FIG. 2, configured to operate in a Gigabit Ethernet retimed mode. In the Gigabit Ethernet retimed mode, data is received from the system at the serial interface 215b and provided to the CDR 219b. The CDR 219b provides the requisite retiming and outputs the data to the optical side via demultiplexer 240(3)b, bypassing encoder/decoder module 230b, to multiplexer 235(2)b, and serial interface 210b. Data received from the optical side is received at serial interface 210a and provided to CDR 219a. The CDR 219a provides the requisite retiming and transmits the data directly to the serial interface 215a. The serial interface 215a transmits the data to the system side.

Figure 9:
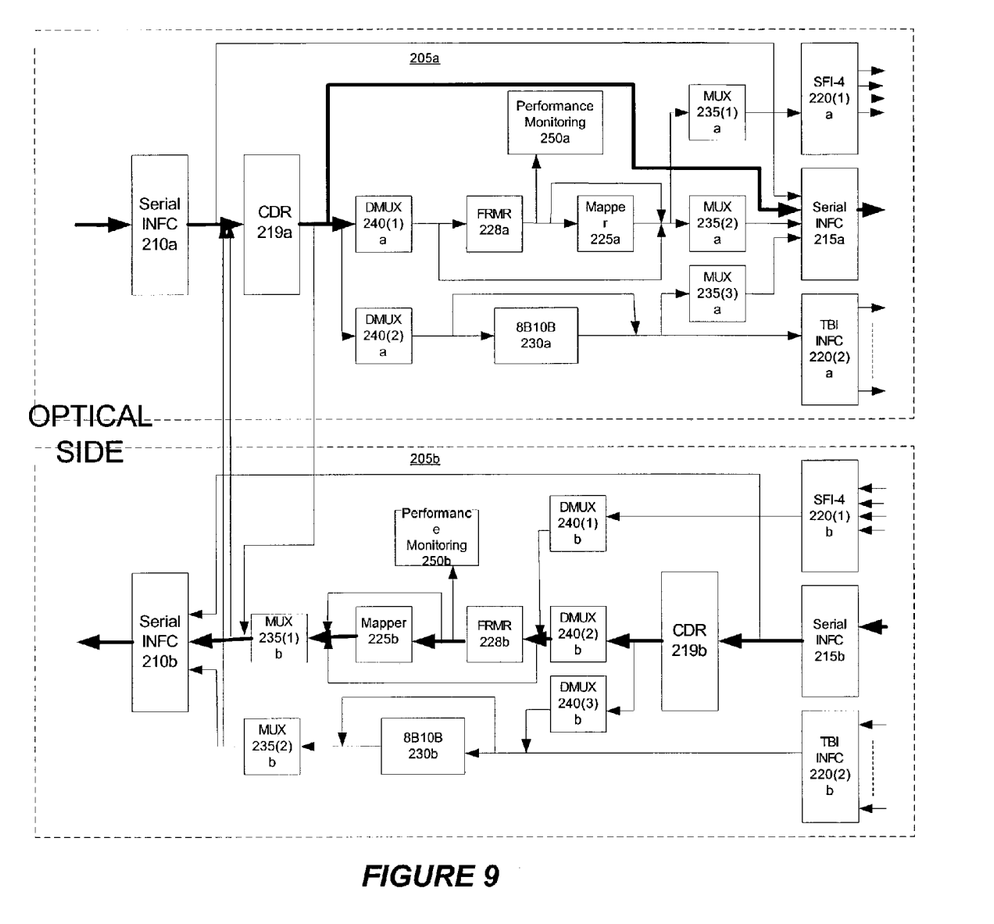
FIG. 9 is a block diagram of the transceiver of FIG. 2 configured to operate in a SONET retimed mode.

Referring now to FIG. 9, there is illustrated a block diagram of the transceiver of FIG. 2, configured to operate in a SONET retimed mode. In the SONET retimed mode, data is received from the system side at the serial interface 215b. The serial interface 215b provides the data to a CDR 219b. The CDR 219b recovers the data and provides a clock signal to demultiplexer 240(2)b. The demultiplexer 240(2)b is a 1:16 DEMUX which deserializes the input signal, thereby resulting in 16-bit words. The 16 bit words are provided to a framer 228b. The framer 228b generates frames which are provided to the mapper 225b. The mapper 225b maps the frames to 16-bit words at 155.5 MHz, thereby resulting in 2.488 Gbps, or OC-48. The signal from the mapper 225b is provided to a 16:1 multiplexer 235(1)b and serial interface 210b.

Data received from the optical side is received at serial interface 210a and provided to CDR 219a. The CDR 219a provides the requisite retiming and transmits the data directly to the serial interface 215a. The serial interface 215a transmits the data to the system side.

Figure 10:
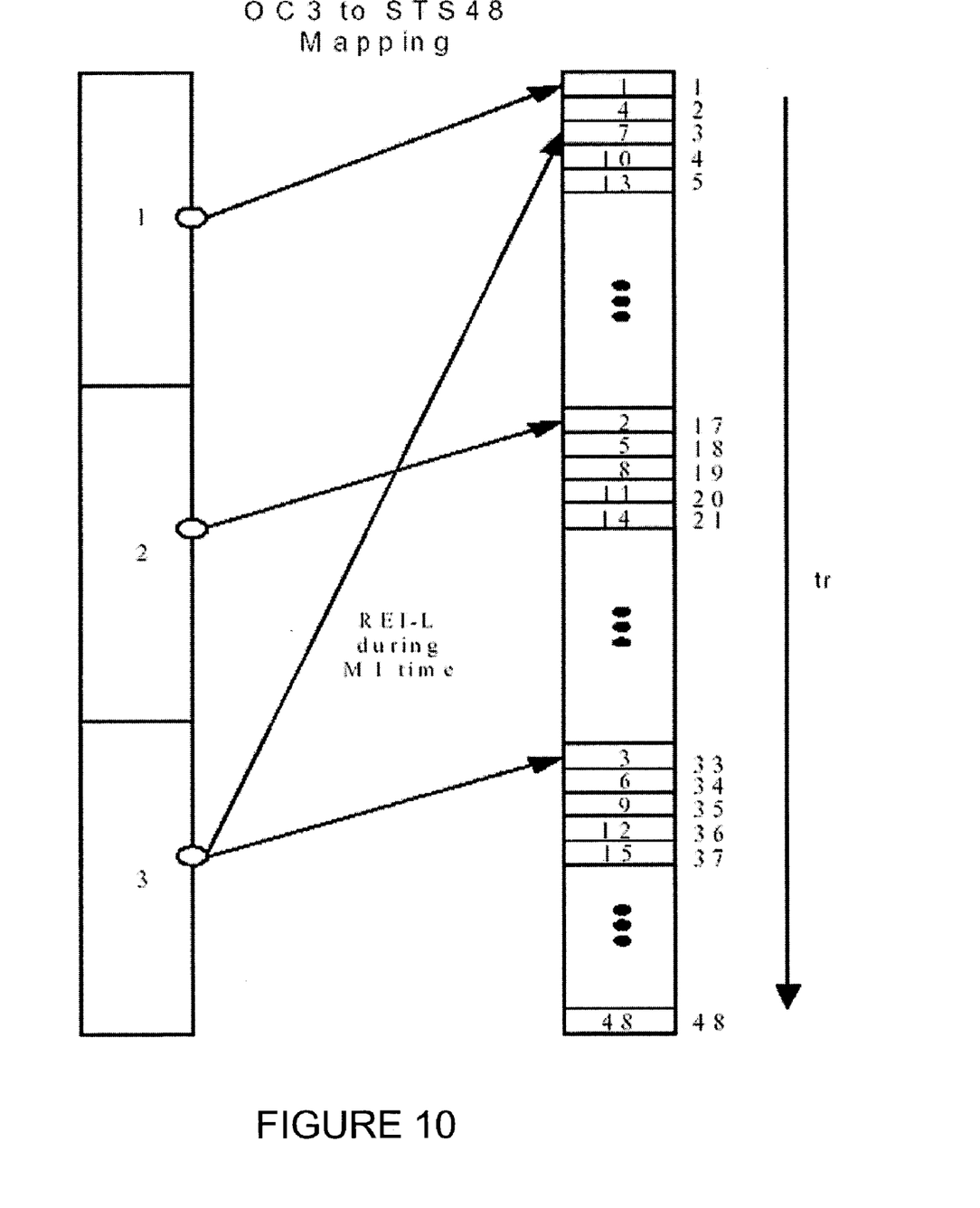
FIG. 10 is a block diagram mapping OC-3 to OC-48 in accordance with an embodiment of the present invention.

Referring now to FIG. 10, there is a block diagram of OC-3 data mapped onto 16-bit wide data words at 155 MHz in accordance with STS-48. The OC-3 data comprises time slots 1,2,3, while the STS-48 comprises time slots, 1 . . . 48. The data from OC-3 time slot 1 is mapped to STS-48 time slot 1. The data from OC-3 time slot 2 is mapped to STS-48 time slot 17. The data from OC-3 time slot 3 is mapped to STS-48 time slots 7 and 33. The remaining STS-48 time slots are filled with 0's or null data.

Figure 11:
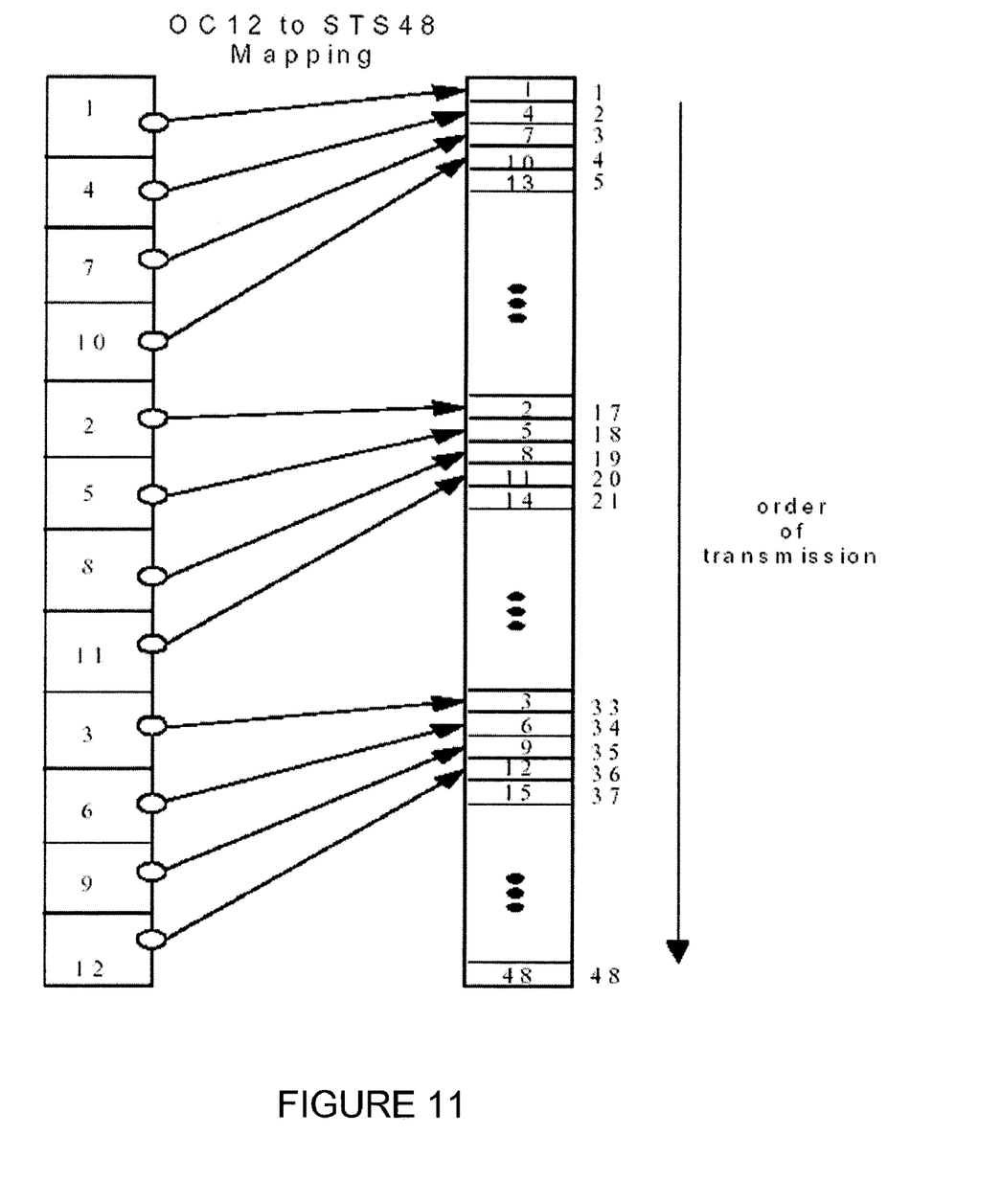
FIG. 11 is a block diagram mapping OC-12 to OC-48 in accordance with an embodiment of the present invention.

Referring now to FIG. 11, there is a block diagram of OC-12 data mapped onto 16-bit wide data words at 155 MHz in accordance with STS-48. The OC-12 data comprises time slots, 1 . . . 12. The time slots, 1 . . . 12 are staggered in order. The staggered ordering begins with time slot 1, and is then ordered with every third time slot following, e.g., 4, 7, and 10. The staggered ordering then continues with time slot 2 followed by every third time slot, e.g., 5, 8, and 11. The staggered ordering then continues with time slot 3 followed by every third time slot, e.g., 6, 9, and 12.

The STS-48 data includes 48 time slots which are similarly staggered, e.g., 1, 4, 7, 10, . . . 46, followed by 2, 5, 8 . . . 47, and 3, 6, 9 . . . 48. The data from each OC-12 time slot n is mapped to the corresponding STS-48 time slot n. The remaining STS-48 time slots are filled with 0's or null data.

The transceiver 120 as described herein may be implemented as a board level product, as a single chip, application specific integrated circuit (ASIC), or with varying levels of the transceiver 120 integrated on a single chip with other portions of the system as separate components. The degree of integration of the monitoring system will primarily be determined by the data speeds, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A transceiver for transmitting data, said transceiver comprising:
    a first interface for receiving data at a first data rate;
    a second interface for receiving data at a second data rate;
    a third interface for receiving data at a third data rate;
    a fourth interface for transmitting the data received at a selected one of first interface, second interface, and third interface;
    at least one mapper for mapping data received at the selected one to the fourth data rate, if the selected one is from the first interface and second interface; and
    an encoder for DC balancing the data from the third interface, if the selected one is the third interface.

2. The transceiver of claim 1, further comprising:
    at least one demultiplexer for deserializing the data received at the selected one, if the select one is from the first interface and second interface.

3. The transceiver of claim 1, further comprising:
    at least one framer for framing the data received from the selected one, if the selected one is from the first interface and second interface.

4. The transceiver of claim 1, wherein the data at the first data rate comprises parallel SONET data.

5. The transceiver of claim 4, wherein the data at the second data rate comprises serial SONET data.

6. The transceiver of claim 4, wherein the data at the third data rate comprises parallel Gigabit Ethernet data.

* * * * *